United States Patent Office 3,544,661
Patented Dec. 1, 1970

3,544,661
CROSS-LINKABLE INTERNALLY PLASTICIZED VINYL CHLORIDE COMPOSITIONS
André Oth and Alexis Mathieu, Brussels, Belgium, assignors to Solvay & Cie, Brussels, Belgium, a Belgian corporation
No Drawing. Filed Aug. 11, 1967, Ser. No. 659,849
Claims priority, application France, Aug. 16, 1966, 73,145
Int. Cl. C08f 15/40
U.S. Cl. 260—879                    17 Claims

ABSTRACT OF THE DISCLOSURE

Cross-linkable internally plasticized vinyl chloride copolymers are prepared by polymerizing 3 to 50 parts by weight and preferably 5 to 25 parts by weight of a mixture of a diolefin and a monomer of the group consisting of nitriles and esters of unsaturated mono- or polycarboxylic acids in the presence of 100 parts by weight of a copolymer of vinyl chloride with a monomer containing at least 8 carbon atoms and selected from the group consisting of vinyl esters of monocarboxylic acids, esters of unsaturated mono- or polycarboxylic acids and alkyl-vinyl ethers.

BACKGROUND OF THE INVENTION

The present invention relates to a process for obtaining new and unobvious cross-linkable internally plasticized vinyl chloride copolymer compositions. The compositions thus obtained when cross-linked are particularly suitable for the manufacture of wrappings and bindings for electric cables, conduits and vessels or chemicals and, generally, for all applications which require excellent resistance to heat.

It is known that the cross-linking of plastics such as polyethylene, ethylene-propylene copolymers and the like results in an improvement of their mechanical properties and the reduction or even the elimination of their thermoplasticity, the reduction or elimination of thermoplasticity being desirable for applications in which heat-resistance is important.

Generally, cross-linked polyethylene is considered, due to a number of excellent general properties, as the best material for the applications mentioned above and especially for the manufacture of cables. Nevertheless, for many applications cross-linked polyethylene has notable shortcomings, particularly its inflammability and low resistance to hydrocarbons. For these applications, vinyl chloride polymers would appear to be potentially useful.

However, polyvinyl chloride is not easily cross-linked by the organic peroxide and polyfunctional agent systems which are most commonly used for cross-linking. Moreover, it tends to be brittle at lower temperatures and, accordingly, requires the presence of large amounts of plasticizers.

If instead of polyvinyl chloride there are employed copolymers of vinyl chloride with monomers which provide internal plasticization there is obtained, with a lesser and acceptable proportion of external plasticizer, a sufficiently plasticized product but, in this case, the subsequent degree of cross-linking obtained is low.

An attempt to overcome this problem has been to mix with polyvinyl chloride small proportions of unsaturated synthetic or natural rubber. However, the thermal stability and resistance to aging of the cross-linked products ultimately obtained are mediocre.

SUMMARY OF THE INVENTION

According to the invention, there is provided a process for preparing cross-linkable, internally plasticized vinyl chloride copolymer compositions which may be cross-linked by the conventional employment of organic peroxide-polyfunctional agent systems to yield a cross-linked product superior to the prior art products and having an excellent resistance to deformation under load at high temperature, excellent mechanical properties, excellent resistance to aging, to chemicals, to flame, to cold and, also, excellent processability.

The process according to the invention comprises polymerizing 3 to 50 parts by weight and preferably 5 to 25 parts by weight of a mixture of a diolefin and at least one monomer of the group consisting of nitriles and esters of unsaturated mono- or polycarboxylic acids in the presence of 100 parts by weight of a copolymer of vinyl chloride with a monomer containing at least 8 carbon atoms and selected from the group consisting of vinyl esters of monocarboxylic acids, esters of unsaturated mono- or polycarboxylic acids and alkyl-vinyl ethers.

The cross-linkable and ultimate cross-linked products obtained as well as the method are considered aspects of the invention.

DESCRIPTION OF THE PREFERRED EMBODIMENTS

To prepare the compositions of the invention, the first step is to prepare a suitable internally plasticized vinyl chloride copolymer. The comonomers employed to provide internal plasticization according to the invention have at least 8 carbon atoms. These monomers may be vinyl esters of monocarboxylic acids containing at least 6 carbon atoms and preferably more than 10 carbon atoms in the acid radical, such as vinyl laurate, palmitate and stearate, esters of unsaturated mono- or polycarboxylic acids, especially alkyl maleates, fumarates, acrylates and methacrylates and even more preferably those having an alkyl chain of 6 to 12 carbon atoms such as octyl fumarate and maleate and ethylhexyl acrylate, and alkyl-vinyl ethers, preferably those in which the alkyl chain has 12 to 18 carbon atoms and most preferably cetyl-vinyl ether.

The weight ratio of the vinyl chloride to the plasticizing comonomer is preferably in the range of 95:5 to 75:25.

The copolymerization involved is a conventional addition polymerization and, accordingly, can be effected by any known means. It is preferred, however, to conduct the copolymerization in an aqueous suspension at a temperature of from 40 to 70° C. in the presence of an initiator soluble in the monomers. Preferred initiators are organic peroxides, particularly lauroyl peroxide, 2,4-dichlorobenzoyl peroxide, and acetylcyclohexanesulfonyl peroxide as well as the peroxydicarbonates.

As usual in addition polymerization in aqueous suspension, a dispersing agent is employed. In this case, the dispersing agent is preferably one which favors porosity of the vinyl chloride copolymers being formed. Examples of such dispersing agents are copolymers of vinylpyrrolidone with an alkyl acrylate the alkyl group of which contains at least 6 carbon atoms, mixtures of polyvinyl alcohol and one or more products resulting from the condensation of a polyoxyalkylene glycol with a polyamine, partially esterified styrene-maleic anhydride copolymers as well as polyvinyl alcohols with a low degree of hydrolysis.

After a sufficient period of time for the polymerization to occur, the resultant vinyl chloride copolymer reaction product is degassed and the modifying step to produce cross-linkability is carried out. As described, above, this step constitutes polymerizing a mixture of a diolefin and one or more monomers of the group consisting of nitriles and esters of unsaturated mono- or polycarboxylic acids in the presence of the vinyl chloride copolymer. The diolefin is preferably butadiene, dichlorobutadiene or isoprene. The other monomer or monomers are preferably acrylonitrile, fumaronitrile, methacrylonitrile or lower alkyl acrylates or methacrylates in which the alkyl group contains from 1 to 4 carbon atoms.

The amount of the mixture of the modifying monomers employed is from 3 to 50 parts by weight and preferably from 5 to 25 parts by weight per 100 parts by weight of the vinyl chloride copolymer. The proportion of the diolefin in the mixture of modifying monomers in from 10 to 99%.

The polymerization of the modifying monomers in the presence of the vinyl chloride copolymer is effected by any conventional additional polymerization technique as in the case of the polymerization by which the vinyl chloride copolymer is initially made. Particularly conveniently, after the initial polymerization by which the vinyl chloride copolymers are made, the modifying monomers and an additional quantity of initiator may simply be introduced into the reaction vessel in which the vinyl chloride copolymer has been produced. Preferably, this second polymerization is conducted at a temperature of from 50 to 100° C.

Excellent dispersion of the modifying monomers in the vinyl chloride copolymer is obtained whereby completely homogeneous compositions are readily obtained.

Prior to cross-linking, the cross-linkable product obtained by the above described process may be mixed with polyvinyl chloride. Such mixtures may be prepared by any appropriate mixing means conventional in the art, for example, hot mixing at a temperature of about 160° C. on a roll mill.

As an alternative to cross-linking with an organic peroxide-polyfunctional agent system, the cross-linkable products of the invention may also be cross-linked by means of an organic peroxide alone.

The organic peroxides employed for the cross-linking are, generally speaking, all the peroxides having a decomposition temperature above 130° C. and, in particular, dicumyl peroxide, 2,5-dimethyl-2,5-di(tert-butyl peroxy) hexyne, di-tert-butyl peroxide, di-tert-butyl hydroperoxide and $\alpha,\alpha'$-di(tert-butyl-peroxy)diisopropylbenzene.

The systems constituted of organic peroxides and polyfunctional agents are constituted of the foregoing organic peroxides in combination with one or more polyfunctional agents which are commonly employed for cross-linking; of the polyfunctional agents, preferred are diallyl phthalate, divinylbenzene, tetraallyloxyethane and the like.

Preferably, from 0.5 to 10 g. of cross-linking system or agent is employed per 100 g. of the cross-linkable resin. The cross-linking system or agent is incorporated into the resin by mixing at a temperature below the decomposition temperature of the peroxide employed.

Prior to the cross-linking, there may be incorporated in the cross-linkable composition various additives selected according to the characteristics required for the various applications intended for the final products.

Plasticizers may be incorporated into the cross-linkable compositions, which plasticizers are preferably phthalic esters such as octyl phthalates (i.e., di(2-ethyl)hexyl and isooctyl phthalates) and dodecyl phthalate, phosphates such as triaryl, trialkyl and arylalkyl phosphates, chlorinated derivatives of aliphatic and aromatic compounds such as chlorinated paraffins and chlorinated diphenyls, and simple or mixed esters of adipic, azelaic, citric and sebacic acids such as octyl adipate and sebacate, and macromolecular plasticizers such as linear polyesters and polymers or copolymers of olefins, modified or not by unsaturated products. The plasticizers employed are preferably low-volatility compounds called "high-temperature plasticizers," which are, in particular, trimellitates, esters of pentaerythritol and di-tridecyl phthalate.

Another class of materials which may be incorporated prior to the cross-linking is stabilizers, among which are metallic salts such as basic salts of sodium, calcium and lead, preferably silicates, carbonates, phthalates and phosphites, and metal salts of fatty acids such as the lead, cadmium, barium, strontium and tin salts, expoxidized vegetable oils and anti-oxidants such as mono- and polyphenols.

Other substances which may be added are fillers, pigments, colorants, lubricants and fungicides.

The cross-linked compositions of the invention have excellent general properties and, among their improved characteristics, particularly notable are good mechanical properties, especially ultimate tensile strength and elongation at break as well as an increase resistance to deformation under load. Moreover, there is little and even essentially no flow at high temperature; in other words, the cross-linked compositions according to the invention maintain their initial mechanical properties after prolonged exposure to high temperature. Additionally, the cross-linked compositions have excellent resistance to abrasion, chemicals and extremes of heat and cold, as well as being inflammable, and also have very satisfactory dielectric properties, are thoroughly stable and are not brittle at low temperature. This combination of properties makes the cross-linked products of the present invention useful in many fields in which vinyl choride polymer based compositions were not considered too useful, especially in the field of casings and bindings for electrical cables.

The invention will now be further described by reference to the following examples which are not intended, however, to limit the scope of the invention.

EXAMPLE 1

Into a 5-liter autoclave, there are introduced 2500 g. of distilled water, 4 g. of polyvinyl alcohol, 4 g. of lauroyl peroxide and 200 g. of octyl fumarate. The autoclave is evacuated by means of a vacuum pump in order to eliminate most of the oxygen present. Then, 800 g. of vinyl chloride is added and the temperature inside the autoclave is raised to 60° C. while the reactants are agitated at a constant speed.

After 12 hours of reaction, the degree of conversion of the monomers is about 90%. The autoclave is degassed to remove unreacted monomers. Then, 50 g. of methyl methacrylate, 50 g. of butadiene and 2 g. of lauroyl peroxide are introduced into the autoclave. The temperature is raised to 80° C. and the new polymerization is continued for two hours.

The resin obtained is washed and then dried in a ventilated oven at 50° C. until a constant weight state is reached. The resin is then mixed with the following ingredients in the following proportions, by weight: 100 parts of resin, 25 parts of di-tridecyl phthalate, 2 parts calcium stearate and 4 parts lead phthalate. This composition is gelled by heating at 145° C. for 10 minutes on a roll mill. The roll temperature is then lowered to 125° C. and 4 parts by weight of dicumyl peroxide and 3 parts by weight of tetraallyloxyethane are incorporated into the mixture. A homogeneous composition is obtained by 10 minutes of mixing.

The mass thus obtained is cross-linked by being heated in a press for 30 minutes at 175° C.

EXAMPLE 2

A cross-linked product is made by the same procedure as described in Example 1 but with the employment of acrylonitrile instead of methyl methacrylate.

EXAMPLE 3

A cross-linked product is made by the same procedure as described in Example 1 but acrylonitrile is used instead of methyl methacrylate and ethylhexyl acrylate is used instead of octyl fumarate.

EXAMPLE 4

A cross-linked product is made by the same procedure as described in Example 1, but vinyl stearate is used instead of octyl fumarate.

EXAMPLE R5 (COMPARATIVE EXAMPLE)

The procedure of Example 1 is followed with respect to the copolymerization of vinyl chloride and a comonomer, but the second copolymerization is omitted. In a 5-liter autoclave, there are introduced 2500 g. of distilled water, 4 g. of polyvinylic alcohol, 4 g. of lauroyl peroxide and 200 g. of octyl fumarate. A vacuum is created in the autoclave to eliminate part of the oxygen present.

There is then added 800 g. of vinyl chloride and inside the autoclave is raised to 60° C. while the reactants are agitated at a constant speed.

The copolymer obtained is washed and dried in a ventilated oven at 50° C. until constant weight. After having added the ingredients set forth in Example 1, the composition is jelled and reticulated following the technique described in Example 1.

EXAMPLE R6 (COMPARATIVE EXAMPLE)

The same procedure as described in Example 1 is carried out but 1000 g. of vinyl chloride is homopolymerized rather than 800 g. of vinyl chloride being copolymerized with 200 g. of octyl fumarate and, moreover, a second polymerization with the modifying monomers (viz, methyl methacrylate and butadiene) is not carried out.

EXAMPLE R7 (COMPARATIVE EXAMPLE)

The same procedure as described in Example 1 is carried out but with the initial homopolymerization of 1000 g. of vinyl chloride rather than the copolymerization of 800 g. of vinyl chloride with 200 g. of octyl fumarate.

EXAMPLE R8 (COMPARATIVE EXAMPLE)

90 parts by weight of polyvinyl chloride obtained according to Example R6 and 10 parts by weight of a butadiene-acrylonitrile synthetic rubber (Butacril BT 205) are mixed together. Then, 100 parts by weight of this mixture are mixed with 25 parts by weight of di-tridecyl phthalate, 2 parts by weight of calcium stearate and 4 parts by weight of lead phthalate, as in Example 1. The subsequent operations as in Example 1 are carried out.

EXAMPLE R9 (COMPARATIVE EXAMPLE)

90 parts by weight of vinyl chloride-octyl fumarate copolymer obtained in Example R5 and 10 parts by weight of the same synthetic resin as employed in Example R8 are mixed. The resin mixture is mixed with di-tridecyl phthalate, calcium stearate and lead phthalate in the same proportions as in Example 1 and the subsequent procedure as described in Example 1 is carried out.

The following tests are performed on the compositions obtained according to each of the foregoing examples: breaking tension and elongation according to ASTM standard D412–51T (type C); resistance to deformation under load at 200° C. by applying at 200° C. to a plate of the composition having an area of 1 square centimeter and a thickness of about 2 millimeters a load of 5 kilograms for a period of 8 minutes and then measuring the percentage of deformation and 5 minutes later measuring the residual deformation as an indicator of the elastic recovery of the composition; resistance to aging, aging being accelerated by placing rectangular test pieces in a ventilated oven for 10 days at 100° C. and then placing the test pieces for 12 hours in the atmosphere at 20° C. Ultimate tensile strength (breaking tension) and elongation at break, ASTM standard D412, are measured both before and after the accelerated aging. The resistance to aging is expressed as the ratio of breaking tension after aging to breaking tension before aging and the ratio of elongation at break after aging to elongation at break before aging.

The compositions according to the examples, the gelling temperatures employed and the behavior of the resin or resin mixture at the time of incorporation of the cross-linking system at 125° C. are indicated in Table I, which follows. In Table II, which follows, the properties of the compositions of each of the examples are tabulated. In the table, due to considerations of space, the following abbreviations are employed: "PVC" for polyvinyl chloride, "VC-OF" for vinyl chloride-octyl fumarate copolymer, "VC-EHA" for vinyl chloride-ethylhexyl acrylate copolymer, "VC-VS" for vinyl chloride-vinyl stearate copolymer, "BUT" for butadiene, "MMA" for methyl methacrylate and "AN" for acrylonitrile.

TABLE 1

| Example | Composition of the resin, parts by weight ||||||||  Gelling temp., °C. | Behavior [1] |
|---|---|---|---|---|---|---|---|---|---|---|
|  | Polymers |||| | Modifying monomers ||| | |
|  | PVC | VC-OF | VC-EHA | VC-VS | Butacril BT 205 | BUT | MMA | AN | | |
| 1 |  | 100 |  |  |  | 5 | 5 |  | 145 | Very good. |
| 2 |  | 100 |  |  |  | 5 |  | 5 | 145 | Do. |
| 3 |  |  | 100 |  |  | 5 |  | 5 | 145 | Do. |
| 4 |  |  |  | 100 |  | 5 | 5 |  | 145 | Do. |
| R5 |  | 100 |  |  |  |  |  |  | 145 | Do. |
| R6 | 100 |  |  |  |  |  |  |  | 160 | Poor. |
| R7 | 100 |  |  |  |  | 5 | 5 |  | 160 | Do. |
| R8 | 90 |  |  |  | 10 |  |  |  | 160 | Do. |
| R9 |  | 90 |  |  | 10 |  |  |  | 145 | Very good |

[1] At the timee of incorporating the cross-linking system at 125° C.

TABLE 2

| | Properties of the cross-linked compositions |||||
|---|---|---|---|---|---|
| | Initial mechanical properties || Resistance to aging || Resistance to deformation ||
| | Tension at break kg./cm.$^2$ | Elongation at break, percent | Ratio of tension at break after aging to tension at break before aging | Ratio of elongation at break after aging to elongation at break before aging | Percentage of deformation | Percentage of residual deformation |
| Example: | | | | | | |
| 1 | 210 | 175 | 1.12 | 0.81 | 40 | 6 |
| 2 | 220 | 170 | 1.10 | 0.76 | 36 | 5 |
| 3 | 220 | 190 | 1.16 | 0.71 | 32 | 3 |
| 4 | 210 | 220 | 1.05 | 0.86 | 35 | 2 |
| R5 | 140 | 200 | 1.20 | 0.90 | 75 | 10 |
| R6 | 180 | 180 | 1.25 | 0.88 | 95 | 91 |
| R7 | 250 | 160 | 1.10 | 0.83 | 92 | 89 |
| R8 | 220 | 185 | 1.15 | 0.35 | 50 | 2 |
| R9 | 210 | 200 | 1.30 | 0.26 | 50 | 4 |

It is noted that in Examples R7 and R8 a gelling temperature of 160° C. instead of 145° C. was employed in order to obtain gelling. In Table I, where behavior at the time of incorporation of the cross-linking system is indicated to be poor, the practical significance of this is that the product is not suitable for the applications contemplated for the products of the invention. Similarly, in Table 2, only the following combination of properties indicates a composition suitable for the applications contemplated for the compositions of the invention: tension at break greater than 150 kg./cm.$^2$, elongation at break greater than 150%, ratio of tension at break after aging to tension at break before aging no greater than 1.25, ratio of elongation at break after aging to elongation at break before aging of at least 0.7, percentage of deformation no greater than 40% and percentage of residual deformation no greater than 8%.

Thus, the products of Examples R5 to R9 each have certain deficient properties which do not permit their use for the applications contemplated for the compositions of the invention. The products of the invention are superior to internally plasticized vinyl chloride copolymers with respect to ultimate tensile strength (tension at break) and to resistance to deformation under load at elevated temperature, to polyvinyl chloride and to the products obtained by the polymerization of methyl methacrylate and acrylonitrile in the presence of polyvinyl chloride with respect to resistance to deformation under load at elevated temperature and to mixtures of polyvinyl chlorides or internally plasticized vinyl chloride copolymers and synthetic rubber with respect to resistance to aging and resistance to deformation under load at elevated temperature.

While the invention has been described by reference to particular embodiments thereof, it is to be understood that such embodiments are intended to be only illustrative and the appended claims are intended to include within their scope not only these embodiments but also all obvious modifications and variations of what is herein disclosed.

What we claim and desire to secure by Letters Patent is:

1. Process for the preparation of cross-linkable internally plasticized vinyl chloride compositions, comprising copolymerizing vinyl chloride and an internally plasticizing comonomer in a weight ratio of the vinyl chloride to the comonomer in the range of 95:5 to 75:25 in the presence of a free radical initiator, said internally plasticizing comonomer containing at least 8 carbon atoms and being selected from the group consisting of vinyl esters of monocarboxylic acids, esters of unsaturated mono- and polycarboxylic acids and alkyl-vinyl ethers, thereby to produce an internally plasticized copolymer of vinyl chloride with the internally plasticizing comonomer and intermixing said copolymer with a mixture of modifying monomers in the proportion of 3 to 50 parts by weight of the monomer mixture per 100 parts by weight of said copolymer and a free radical initiator thereby effecting the reaction of said monomers with said copolymer, said monomer mixture comprising a conjugated diolefin and at least one monomer selected from the group consisting of nitriles and esters of unsaturated mono- and polycarboxylic acids.

2. Process according to claim 1, in which the ratio of the modifying monomers to the vinyl chloride copolymer is 5 to 25 parts by weight of the modifying monomers mixture per 100 parts by weight of the copolymer.

3. Process according to claim 1, in which the proportion of the modifying monomers mixture constituted by the diolefin is from 10 to 99%.

4. Process according to claim 3, in which the diolefin is selected from the group consisting of butadiene, dichlorobutadiene and isoprene.

5. Process according to claim 1, in which the nitriles of unsaturated mono- and polycarboxylic acids are selected from the group consisting of acrylonitrile, fumaronitrile and methacrylonitrile.

6. Process according to claim 1, in which the esters of unsaturated mono- and polycarboxylic acids used in mixture with the diolefin are selected from the group consisting of lower alkyl esters of acrylic and methacrylic acids, said lower alkyl containing 1 to 4 carbon atoms.

7. Process according to claim 1, in which the internally plasticizing comonomer is a vinyl ester of monocarboxylic acids, selected from the group consisting of vinyl laurate, vinyl palmitate and vinyl stearate.

8. Process according to claim 1, in which the internally plasticizing comonomer is an ester of unsaturated mono- and polycarboxylic acids selected from the group consisting of alkyl maleates, fumarates, acrylates and methacrylates in which the alkyl contains from 6 to 12 carbon atoms.

9. Process according to claim 1, in which the internally plasticizing comonomer is an alkyl-vinyl ether which contains 12 to 18 carbon atoms.

10. Process according to claim 9, in which the alkyl-vinyl ether is cetyl-vinyl ether.

11. The product of the process of claim 1.

12. The product obtained by intermixing the product of claim 1 with an organic peroxide having a decomposition temperature above 130° C. to effect cross-linking.

13. The product obtained by intermixing the product of claim 1 with an organic peroxide and a polyfunctional cross-linking agent to effect cross-linking.

14. The process according to claim 1 in which said conjugated diolefin is butadiene.

15. The process according to claim 1 in which said internally plasticized copolymer is copolymerized with said mixture of modifying monomers in aqueous suspension.

16. The process according to claim 1 in which said copolymerization of said vinyl chloride and said plasticizing comonomer is carried out in an aqueous suspension.

17. The process according to claim 16 in which the copolymerization of the thus produced internally plasticized copolymer and said mixture of monomers is carried out in said aqueous suspension of said copolymer.

References Cited

UNITED STATES PATENTS

| 3,281,345 | 10/1966 | Kuhne et al. | 204—163 |
| 3,327,022 | 6/1967 | Riou et al. | 260—879 |
| 3,330,886 | 5/1967 | Riou et al. | 260—879 |
| 3,428,707 | 2/1969 | Amos et al. | 260—827 |
| 3,382,215 | 5/1968 | Baum | 260—77.5 |

JOSEPH L. SCHOFER, Primary Examiner

R. A. GAITHER, Assistant Examiner

U.S. Cl. X.R.

260—78.5, 86.7